United States Patent [19]

Russell

[11] Patent Number: 4,815,852
[45] Date of Patent: Mar. 28, 1989

[54] APPARATUS FOR MEASURING ROTATION BY A COMBINATION OF THE SAGNAC AND FIZEAU EFFECTS

[76] Inventor: Robert B. Russell, 288 Heath St., Chestnut Hill, Mass. 02167

[21] Appl. No.: 844,195

[22] Filed: Mar. 26, 1986

[51] Int. Cl.[4] ............................................. G01C 19/64
[52] U.S. Cl. .................................................... 356/350
[58] Field of Search ........................... 356/350; 372/94

[56] References Cited

U.S. PATENT DOCUMENTS 3,332,314  7/1967  Rosenthal ............................ 356/350
4,183,670  1/1980  Russell ................................ 356/350

FOREIGN PATENT DOCUMENTS 1812463  8/1969  Fed. Rep. of Germany ...... 356/350

OTHER PUBLICATIONS

Post "Sagnac Effect" Review of Modern Physics, vol. 39, No. 2, Apr. 1967, pp. 475–479.
Vali et al., "Fresnel–Fizeau Effect in a Rotating Optical Fiber Ring Interferometer" Applied Optics, Oct. 1977, vol. 16 #10, pp. 2605–2607.

*Primary Examiner*—Vincent P. McGraw
*Attorney, Agent, or Firm*—Russell & Tucker

[57] ABSTRACT

Rotation is detected by splitting a beam of phase coherent light into two beams and directing them separately and oppositely around paths at least one of which is separated from and surrounds the axis of rotation. A light transmitting medium having a substantial index of refraction is interposed in said at least one path. The beams are then combined to form a fringe pattern and rotation is indicated by a shift in the fringe pattern due to the Fizeau effect. The length of said medium is made as long as it can be made while still retaining sufficient coherence in the light and intensity to detect the fringe pattern efficiently.

12 Claims, 1 Drawing Sheet

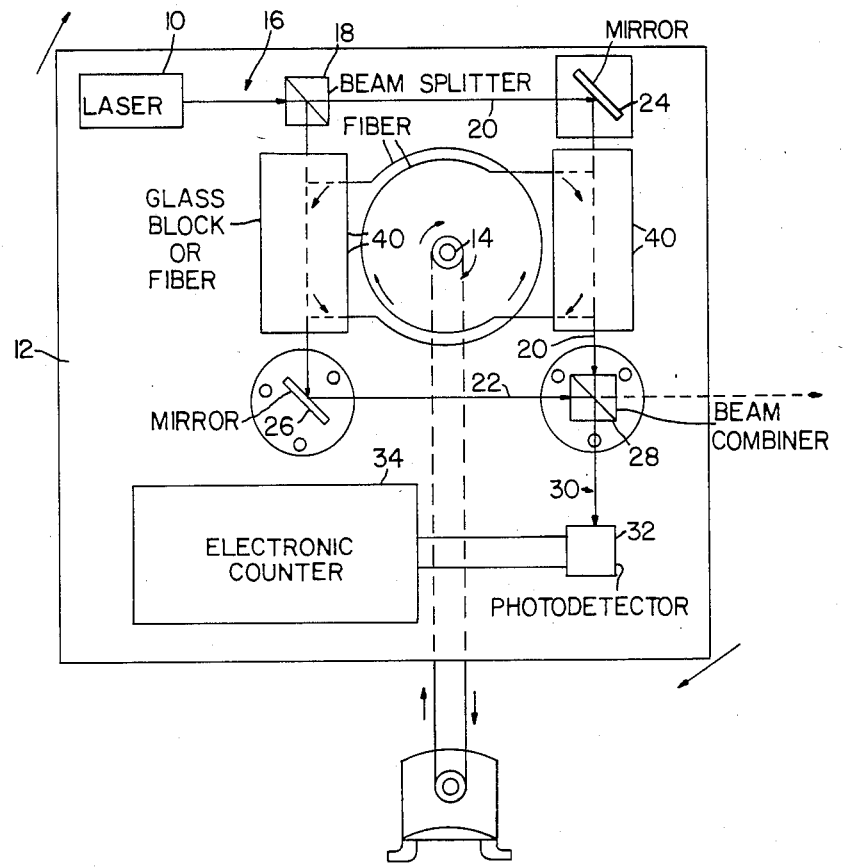

APPARATUS FOR MEASURING ROTATION BY A COMBINATION OF THE SAGNAC AND FIZEAU EFFECTS

FIELD OF THE INVENTION

The present invention relates to detecting rotation and more particularly to optical gyroscopes as discussed in my prior U.S. Pat. No. 4,183,670.

BACKGROUND OF THE INVENTION

This invention stems from Michelson's experiment in which he measured the rotation of the earth by the Sagnac effect. Michelson used an evacuated tube buried underground and laid out in a 6200 foot rectangle, and he was able to detect a shift of 0.230 of a fringe of light having a wave length of 5700 A (Ditchburn LIGHT, p.339). This was within 1% of the calculated value and demonstrated that an optical gyroscope of high accuracy is feasible. Michelson's device, of course, was too large to be useable as a practical matter, but his success has stimulated efforts ever since then to reduce it in size in order to make it practical. So far it has not been achieved. It was an object of the specific embodiments described in my prior patent, but as I pointed out therein, noise was a major problem. This invention has essentially the same objectives.

The state of the art in this field is discussed by Dana Z. Anderson in the April 1986 issue of Scientific American. In particular he describes using long lengths of optical fibers to maximize the Sagnac effect. Such usage has long been an obvious choice ever since good optical fibers came on the market in the late 1970's, but a practical device using them has yet to be developed as Mr. Anderson notes in his article.

One problem is that laser light has a tendency to lose its phase coherence after it has travelled more than a few dozen meters. This makes it difficult to obtain accurate measurements using long lengths of optical fibers by detecting the nodes or loops of a laser-formed standing wave. On the other hand, optical glass has another property which can be used to advantage, i.e. the Fizeau effect and the Fresnel convection coefficient whereby the velocity of light in a moving medium is changed due to motion of the medium. It is a way by which the delay required in the mode of operation of my said prior patent may be introduced using the rotation of the platform as the source of motion.

It is an object of this invention to make an improved optical gyroscope which overcomes the disadvantages of the prior art and amplifies both the Sagnac and Fizeau effects to the point where a practical device can be made. A further object is to provide an optical gyroscope in which the Fizeau effect is maximized within the limits of preserving the accuracy of measurement by the use of phase-coherent light.

BRIEF DESCRIPTION OF THE INVENTION

In the accomplishment of these and other objects in a preferred embodiment of the invention, I mount a laser on a platform arranged to direct a beam of phase-coherent light onto a beam splitter. From the beam splitter, the two beams pass around a rectangle to a beam combiner as in my prior patent. In each leg of the square, I place a light transmitting medium having a substantial index of refraction in the path of the light. The combined beams are projected onto a photodetector, also as in my prior patent. The length of the medium is chosen to maximize the length of the light path in the glass without attenuating it below the point of detectability, and short of the point at which the laser light starts to lose its phase coherence substantially. The combined beams form a fringe pattern, but since the beam is so narrow, all one sees at the combiner is what appears to be an "on-off" output.

When the system is not rotating, i.e. when the plane of the platform is parallel to the axis of the earth, there will be no shifting of fringe pattern and no output at the photodetector as long as there is no noise in the system (air currents, thermal changes, etc.). If the platform is rotated as, for example, by lowering it to the horizontal so as to pick up the rotation of the earth, the velocity of the light in the glass on one side of the square will be increased and lowered on the other side, due to the Fizeau effect. While this change is taking place, the fringe pattern shifts producing a number of beats at the photodector, the number being determined by the wavelength of the light, the index of refraction of the glass, and the velocity of the rotation, in accordance with Fresnel's coefficient, and will be proportional to the rate of rotation.

An electronic counter is employed to keep track of these beats. Apparatus of this sort is extremely sensitive to changes in ambient conditions (i.e. moving air, vibrations, thermal changes, etc.). These can be minimized in a preferred embodiment by enclosing the apparatus in an evacuated housing and by additionally controlling the surrounding temperature. Also, holding the apparatus at the point of no rotation by servoing it in response to any movement of the fringe pattern off the zero point, improves accuracy. In this latter instance the rate of rotation is determined by the rate at which the servo has to drive the platform to keep it from rotating.

BRIEF DESCRIPTION OF THE DRAWINGS

In the drawings, the single figure is a plan view showing the components diagramatically for a single plane.

DETAILED DESCRIPTION OF THE INVENTION

In a preferred embodiment of the invention, I mount a laser 10 on a platform 12 mounted for rotation about an axis 14. This axis need not be a bearing. The laser is arranged to direct a beam of light 16 onto a beam splitter 18, so as to form two beams 20, and 22. In one embodiment, beam 20 proceeds to front face mirror 24 and thence to beam combiner 28 around one side of a square. Beam 22 passes around the other side to mirror 26 and thence to the beam combiner 28. The combined beam 30 is then passed to a photodetector 32, as in my said prior patent the specification of which I incorporate herein by reference.

In each of the legs of the square, I place a light transmitting medium 40 having a substantial index of refraction such as a glass block or optical fibers. There is no need to make the elements which make up this medium optically perfect or that they be exactly the same length. This is because, as long as the path lengths are nearly equal and the recombined beams are close to coincident, the fringe pattern resulting from phase-coherent light of the same frequency, which is necessary for accurate measurement, will be present. This can be achieved with substantial lattitude in the elements 40. As the effective path length in elements 40 on one side changes relative to the other side, the output of the combiner appears to blink. This is because the beam width is only a small fraction of the width of a fringe. What is actually happening is that the fringe pattern is shifting laterally. That the rise and fall of intensity is graded from one side to the other depending on the direction of the shift of the fringe pattern can be observed by careful inspection of a projection of the beam onto a piece of paper close to the combiner.

Due to a shift in the velocity of light in the medium due to motion in response to Fresnel's "drag" effect, when the platform is rotated, there will be a shift in the fringe pattern at the photodetector which will be proportional to the rate of rotation. This shift is greater and the device is more sensitive, the longer are the elements and the device is more sensitive, the longer are the elements 40. For this reason, I make them as long as I can and still have sufficient light for detection and at the same time retain the phase coherence of the laser light at the beam combiner 40. This length will differ for different materials and types of light. Once a given medium has been selected it is but a simple task to determine the points at which attenuation or the loss of phase coherence preclude efficient detection. The preferred length is the longest at which both are retained. I consider that an apparatus in which these interacting factors are maximized, is novel and I intend to claim it broadly herein.

Since the direction of the shift of the fringes depends upon the direction of rotation of platform relative to the earth, and since this can be detected by a close analysis of the beam, the photodetector is provided with a multiplicity of small detectors acting cooperatively with a microprocessor to indicate the direction of rotation. This feature is particularly important when using the no rotation mode of operation.

In order to reduce noise, I take standard precautions such as an evacuated housing, temperature control, and mountings designed to eliminate vibration. Such things are standard in this art, and need not be illustrated.

The technique of servoing the apparatus to stay on the point of no rotation, described above has the further advantage of eliminating errors due to frequency drift of the laser.

It will be noted that the condition of the light in the respective light paths differs from that described by Mr. Anderson in that the beams travel independently and do not mix until they reach the combiner. Thus there is no standing wave either within the elements 40 themselves or in the combiner 28. This avoids the risk of "phase lock" which has hampered the development of the ring laser.

Also elements 40 can be glued to the splitter 18 and the combiner 28 by balsam glue so as to reduce the loss of light due to surface scatter and the mirrors 24 and 26 can also be incorporated in the glass without requiring the light to pass through air at all. On the other hand for purposes of matching the beams at the combiner, it is convenient to have means for adjusting both the combiner and the beam of at least one element 40.

It will be understood that, without departing from the invention, the beams 20 and 22 can be off-set slightly and additional mirrors can be employed above or below the splitter and combiner in order to make the light take one or more circuits around the square (or other shape) before being projected onto the combiner. In this case staight (or nearly straight) lengths of optical fiber can be used, or combinations of glass blocks and optical fibers. In addition, the optical fibes can be wound around the square, obviating the need for mirrors. In each of these embodiments the length of the light paths is gauged to be the longest at which there is sufficient light for detection and at the same time the phase-coherence of the light is not reduced below the level of efficient detection.

I claim:

1. Apparatus for measuring rotation by a combination of the Sagnac and Fizeau effects comprising:
    a platform mounted for rotation around an axis;
    a source of phase coherent light mounted on said platform;
    means for splitting a beam of said light to form two beams, and directing the two beams separately and oppositely around said axis on paths at least one of which is separated from said axis;
    means for combining said beams while pointing said combined beams in a substantially coincident direction to provide a substantially "on-off" fringe pattern condition downstream of said combining means when said beams retain substantial phase-coherence, and a shift in the respective effective light path lengths of the beams occurs;
    means responsive to the Fizeau effect between said splitter and said combiner in said at least one path comprising a light transmitting medium having a substantial index of refraction and said means dimensioned with respect to the phase coherence of said light to be at its maximum length short of the dimension at which said light will lose a substantial portion of its phase coherence when passing through said medium; and
    means for detecting shifting of said fringe pattern due to a combination of the Sagnac and Fizeau effects when said platform is rotated relative to a substantial gravitational field.

2. The apparatus defined in claim 1 further characterized by:
    means responsive to said detecting means for indicating the amount of shift of said pattern.

3. The apparatus defined in claim 1 further characterized by:
    means responsive to said detecting means for rotating said platform to compensate for said change and to restore said fringe pattern to its original position.

4. The apparatus defined in claim 1 further characterized by:
    said medium comprising at least one solid glass block.

5. The apparatus defined in claim 1 further characterized by:
    said medium comprising optical fiber.

6. The apparatus defined in claim 5 further characterized by:
    said optical fiber in straight lengths and,
    mirrors in said light path to direct said light around said axis.

7. The apparatus defined in claim 1 further characterized by:
    said medium comprising combinations of optical fibers and glass.

8. The apparatus defined in claim 5 further characterized by:
    said optical fiber curved.

9. The apparatus defined in claim 5 further characterized by:
    said optical fiber wound around said axis.

10. The apparatus defined in claim 1 further characterized by:

means for directing said light in planes slightly offset from the plane of said platform into a plurality of circuits therearound.

11. The apparatus defined in claim 1 further characterized by:
 means associated with said detecting means for individually detecting the intensity level of various portions across the combined beam, and for indicating the direction of shift of said pattern thereby.

12. The apparatus defined in claim 1 further characterized by:
 means in one said path for adjusting the direction of one said beam at said combiner.

* * * * *